United States Patent Office 2,904,537
Patented Sept. 15, 1959

---

2,904,537

POLYBENZOXAZOLES

Keith Clark Brinker, Donald Dean Cameron, and Ivan Maxwell Robinson, Wilmington, Del., assignors to E. I. du Pont de Nemours and Company, Wilmington, Del., a corporation of Delaware No Drawing. Application October 28, 1955
Serial No. 543,598

12 Claims. (Cl. 260—78)

This invention relates to novel condensation polymers, and more particularly to novel linear polybenzoxazoles.

Since their discovery, linear condensation polymers such as the polyamides and polyesters have found wide application in the plastic industry in the form of fibers, films and molded articles. The polyamides described in Wallace H. Carothers' U.S. Patents 2,071,250 and 2,071,253, issued February 16, 1937, and U.S. Patent 2,130,948, issued September 20, 1938, for example, are tough, wear resistant, resilient, stable polymers useful over a wide range of conditions. However, the search for polymers having still higher softening temperatures, better retention of stiffness and toughness at elevated temperatures, improved resistance to water and oxygen has continued. The present invention was made as the result of this search for improved polymers.

This invention has as its object the production of new and valuable polymeric materials. A further object is a novel type of condensation polymer characterized by outstanding weatherability, high softening points, low water adsorption and high crystallinity. Further objects reside in the process by which the novel condensation polymers are prepared. Other objects will become apparent hereinafter.

It has now been discovered that the reaction of a carboxylic acid group with a hydroxy amino phenyl group, in which the hydroxy and amino groups are attached to adjacent carbon atoms of the benzene ring to form a benzoxazole ring, can be employed to form linear condensation polymers having the desirable combination of properties described hereinabove. It has been found that, in contrast to hydroxy and amino groups attached to adjacent carbon atoms of an aliphatic hydrocarbon molecule, the hydroxy and amino groups attached to adjacent carbon atoms of a benzene ring react rapidly to form an oxazole ring and that this reaction can be utilized to form valuable, linear high molecular weight polybenzoxazole resins.

Similarly, as polyamides may be obtained by the condensation of amino acids and by the condensation of diamines with dicarboxylic acids, the polybenzoxazoles may be obtained by the condensation of amino hydroxy phenyl alkanoic acids and by the condensation of bis-hydroxy amino phenyl compounds and dicarboxylic acids. The amino hydroxy phenyl alkanoic acids used in the present invention have the following general formula:

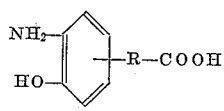

wherein R is a divalent hydrocarbon radical having at least 1 carbon atom between the phenyl group and the carboxylic acid group. Preferably, the alkanoic acid group is attached to a carbon atom of the benzene ring which is in para position to either the hydroxy group or the amino group. It is, of course, possible to use a divalent hydrocarbon radical which is substituted by methyl groups or other hydrocarbon groups, as shown in the examples hereinbelow, to improve certain properties such as crystallinity of the resulting polymer. In general, it is preferred to use hydrocarbon radicals having a carbon chain not exceeding 6 carbon atoms to preserve the improved properties obtained by the polybenzoxazoles as compared to polyamides, although polymers with lower softening points are readily obtained from hydroxy amino phenyl alkanoic acids where the carboxyl group is separated from the phenyl ring by more then six carbon atoms. The total number of carbon atoms of the preferred divalent hydrocarbon radical placed between the phenyl group and the carboxylic acid group may, of course, exceed 6 if the substituents on the chain are included.

This bis-amino hydroxy phenyl compounds used to prepare the polybenzoxazoles of the present invention have the following general formula:

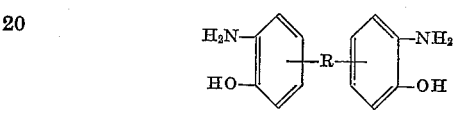

wherein R is a carbon-to-carbon bond linking the two aromatic rings or a divalent hydrocarbon radical. Because of the difficulty of preparing the bis-o-aminophenols, R is preferably a carbon-to-carbon bond. This carbon-to-carbon-bond is preferably para to the amino group or para to the hydroxy group. The bis-o-aminophenols are condensed with those dicarboxylic acids and derivatives thereof such as esters which are useful in the preparation of polyamides, and particularly those wherein the carboxylic acid groups are separated by 4 to 8 methylene groups.

The polybenzoxazoles of the present invention are formed as the result of the following condensation reactions:

(1)

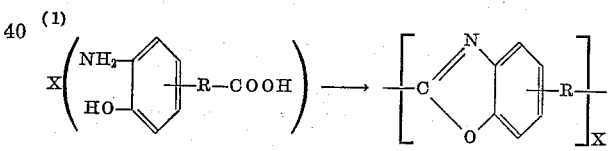

(2)

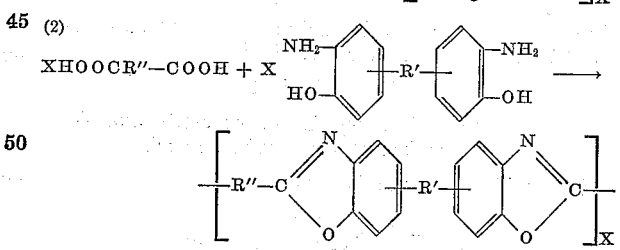

wherein R is a divalent hydrocarbon radical and R' and R" are groups of the class consisting of carbon-to-carbon bonds and divalent hydrocarbon radicals. Both types of polybenzoxazoles thus have in common a recurring benzoxazole group attached to a hydrocarbon chain.

The condensation reaction to form the polybenzoxazoles of the present invention occurs smoothly on heating the monomer or equivalent quantities of the monomers in the absence of oxygen to temperatures of 100 to 350° C. for extended periods of time. To insure high molecular weights, a vacuum cycle may be added to the polymerization process; such, however, is often not necessary in the condensation of bis-amino hydroxy phenyl compounds and dicarboxylic acids.

The invention is further illustrated by the following examples, in which parts are by weight unless otherwise stated.

EXAMPLE I

*Preparation and polymerization of 3-amino-4-hydroxyhydrocinnamic acid*

The monomer was prepared by the following stepwise reactions. 4-hydroxybenzaldehyde was heated with a small molar excess of malonic acid and a small quantity of pyridine according to the procedure of K. C. Pandya and T. A. Vahidy, Proc. Ind. Acad. Sc., 4A 134 (1936). A 74% yield of 4-hydroxycinnamic acid was obtained. The 4-hydroxycinnamic acid was reduced to the 4-hydroxyhydrocinnamic acid using a Raney-nickel catalyst and hydrogen with methanol as the solvent according to the procedure described by C. Stöhr, Ann., 225, 75 (1884). A nearly quantitative yield was obtained. The 4-hydroxyhydrocinnamic acid was nitrated to 3-nitro-4-hydroxyhydrocinnamic acid using aqueous nitric acid at a temperature of 0–5° C. according to the procedure described by C. Stöhr, Ann., 225, 75 (1884). The isolated 3-nitro-4-hydroxyhydrocinnamic acid was reduced to the ammonia derivative with Raney nickel at a temperature of 25° C. under a pressure of 600 p.s.i. hydrogen according to the procedure of H. Adkins, "Reactions of Hydrogen," University of Wisconsin Press, 1937, p. 95. The methanol recrystallized 3-amino-4-hydroxyhydrocinnamic acid was found to have a melting point of 196° C.

The polymerization of 3-amino-4-hydroxyhydrocinnamic acid was carried out by heating the monomer under nitrogen in a closed reaction vessel at 195° C. for 1.5 hours and then at 255° C. for 3.5 hours. The temperature was then increased to 285° C. and the pressure reduced to 5 mm. mercury (absolute), at which pressure the reaction mixture was maintained for 1.5 hours. On cooling to room temperature, the polybenzoxazole was removed from the reaction vessel in the form of a solid mass, which was extremely tough. The polybenzoxazole could be compression molded at 400° C. to a tan, opaque, flexible film which was tough at room temperature and which could be cold drawn. The polymer was insoluble in water, ethanol, toluene, chloroform and dimethyl formamide. The polybenzoxazole was swelled only slightly in hot sulfuric acid, but did not dissolve even on prolonged heating.

The water absorption of the polymer in boiling water was 1.3%. No polymer dissolved in the water on boiling for five days. The crystallinity of the film was found to be about 75% as determined by X-ray diffraction pattern. No apparent changes except a slight yellowing of the film was found on exposing a film of the polybenzoxazole to 900 hours of accelerated weathering.

EXAMPLE II

*Preparation and polymerization of 3-(3-amino-4-hydroxyphenyl)-3-methylbutyric acid*

This acid having the formula:

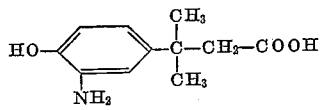

was prepared in the following manner. Methoxybenzene was admixed with sulfuric acid and reacted with methallyl chloride at a temperature below 5° C. to yield 4-chlorotertiarybutyl methoxybenzene. The 4-chlorotertiarybutyl methoxybenzene was reacted with magnesium and carbon dioxide using the standard Grignard procedure as outlined in Gilman and Blatt, Organic Synthesis, vol. I, 2nd edition, to give a 97% yield of the acid derivative, 3-(4-methoxyphenyl)-3-methylbutyric acid. The 3-(4-hydroxyphenyl)-3-methylbutyric acid was prepared from the methoxy compound by refluxing with a hydrobromic acid acetic acid mixture as outlined by Levine et al. in J.A.C.S., 70, 1930 (1948). The hydroxy acid was nitrated using an aqueous acetatic acid-nitric acid mixture according to the procedure used in the previous example and hydrogenated with a platinum oxide catalyst according to the procedure described in J.A.C.S., 49, 1093 (1927), to yield the 3-(3-amino-4-hydroxyphenyl)-3-methylbutyric acid.

The polymerization of 3-(3-amino-4-hydroxyphenyl)-3-methylbutyric acid was carried out by heating the acid in a nitrogen atmosphere at 275° C. for 20 minutes and then reducing the pressure to 10–20 mm. mercury and continuing to heat the reaction mixture at that pressure for five hours. The resulting polybenzoxazole was a light amber plug. The polymer could be compression molded into flexible tough films by heating to 350° C. under pressure. Prolonged heating of the polybenzoxazole in m-cresol resulted in solution of the polymer. The inherent viscosity of the polybenzoxazole in m-cresol (0.5% concentration) was above 1 indicating a high molecular weight. Equilibrium water absorption in boiling water was measured to be 1.6%. Films prepared from the polybenzoxazole were found to be highly crystalline as measured by X-ray diffraction pattern.

EXAMPLE III

*Preparation and polymerization of 5-(3-amino-4-hydroxyphenyl)-5-methylhexanoic acid*

This acid having the formula

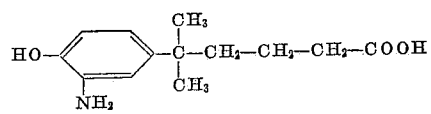

was prepared in the following way. Methoxybenzene was alkylated with 5-methyl-5-hexenenitrile using hydrogen fluoride as a catalyst using the procedure outlined in J.A.C.S. 61, 1010 (1939), by W. S. Calcott et al. (The nitrile is readily prepared by reaction of isobutylene with acrylonitrile.) The product 5-(4-methoxyphenyl-5-methylhexenenitrile was refluxed with sulfuric acid, converting the nitrile into an acid, using the procedure outlined in Gilman and Blatt Organic Synthesis, vol. I, 2nd edition, p. 436. The unpurified acid was then reacted with a hydrobromic acid-acetic acid mixture, and an over-all yield of 70% of 5-(4-hydroxyphenyl)-5-methylhexanoic acid was obtained. The hydroxy acid was nitrated using an aqueous acetic acid-nitric acid mixture and reduced with hydrogen using a platinum oxide catalyst to yield the 3 - (3 - amino - 4 - hydroxyphenyl)-5-methylhexanoic acid by the procedures employed in the previous example.

The polymerization of 5-(3-amino-4-hydroxyphenyl)-5-methylhexanoic acid was carried out by heating the acid in a nitrogen atmosphere at 275° C. for 20 minutes and then reducing the pressure to 10–20 mm. mercury (absolute) and continuing heating at that pressure for a period of five hours. The polybenzoxazole obtained was transparent and light amber in color. The polybenzoxazole could be compression molded by heating under pressure to 325 to 350° C. in tough, flexible films. The equilibrium water adsorption in boiling water was 2.1%. The polybenzoxazole was found to be soluble in m-cresol. Benzene, toluene and chloroform produced considerable swelling but did not completely dissolve the polymer. The inherent viscosity of the polymer, measured in a 0.5% solution of the polybenzoxazole in m-cresol was 1.31. After 700 hours exposure to accelerated weathering, the only apparent change was a slight decrease in transparency.

EXAMPLE IV

*Polybenzoxazole formed by the condensation of 3,3'-dihydroxybenzidine and sebacic acid*

The hydroxy amino monomer, 3,3'-dihydroxybenzidine used in the present example was obtained in about 90% yield by demethylation of commercially available o-dianisidine with aluminum chloride according to the procedure described in U.S. Patent 2,497,248, issued February 14, 1950, to Curt G. Vogt and Franz Marschall.

Into an autoclave was charged 10.00 parts of 3,3'-dihydroxybenzidine and 9.35 parts of sebacic acid. The autoclave was flushed with nitrogen and the reaction mixture was heated from 200° C. to 305° C. over a period of 1.5 hours. The resulting polymer was found to have an inherent viscosity of 0.53 as measured by a 0.5% solution in meta-cresol. The polymer was found to have a sharp crystalline melting point at 250° C. The polybenzoxazole could be compression molded into tough transparent films by heating under pressure to 280° C. and quenching the film from above the melting point.

EXAMPLE V

Polybenzoxazole formed by the condensation of 3,3'-dihydroxybenzidine and mixed dibasic acids Into an autoclave was charged 10.0 parts of 3,3-dihydroxybenzidine and 8.29 parts of a mixed dibasic acid comprising 81% of suberic acid, 17% azelaic acid and 1% of sebacic acid. The autoclave was flushed with nitrogen and heated at 200 to 305° C. for a period of 6 hours. After heating for 15 minutes, the major portion of the water had been evolved and a quite viscous polymer had formed. The resulting polybenzoxazole was light amber in color and transparent. The inherent viscosity of the polybenzoxazole was 1.18 as measured by 0.5% solution of the polymer in meta-cresol. The polybenzoxazole was found to have a melting point of approximately 255° C. The polybenzoxazole could be compression molded into tough films by heating the polymer at 280° C. under pressure and quenching the film. X-ray diffraction pattern of the film indicated that the film was essentially amorphous. On heating a quenched, amorphous film of the polybenzoxazole at 150° C. for a period of 1.5 hours, the crystallinity of the film increased to over 50%. The crystalline film was tough, having a stiffness of 390,000 lbs./sq. in. at room temperature and a tensile strength of 9,170 lbs./sq. in. The water adsorption of a film exposed to boiling water for 24 hours was 0.77%. The polybenzoxazole was readily extruded into cold drawable fibers.

The polybenzoxazole was injection molded into bars employing a cylinder temperature of 300° C. and a mold temperature of 75° C. The flexural modulus of polybenzoxazole injection molded bars, measured according to ASTM tests, was found to be 365,000 lbs./sq. in. at 23° C. The Izod Impact Strength of the bars was 1.69 ft. lb./in. The creep rate of the bar was $3.5 \times 10^{-5}$ inch/inch/hr. at 7,000 lbs./sq. in. stress.

The polybenzoxazoles of the present invention in general have inherent viscosities ranging from 0.4 to 1.5. The term "inherent viscosity" or "$\eta_{inh.}$" as used herein is defined by the following equation:

$$\eta_{inh.} = \frac{ln\eta_{rel.}}{C}$$

wherein ln represents natural or Napierian logarithm. C is the concentration of the solute in grams per 100 cc. of solution and $$\eta_{rel.} = \frac{\eta \text{ solution}}{\eta \text{ solvent}}$$

$\eta$ being the viscosity.

The polybenzoxazoles of the present invention are readily modified by copolymerization. As already shown by the examples, it is possible to use more than one dicarboxylic acid in the condensation with bis-amino hydroxy phenyl compounds. Similarly, more than one bis-amino hydroxy phenyl compound may be employed in the condensation. It is further possible to use more than one hydroxy amino phenyl alkanoic acid to obtain mixed polybenzoxazoles. Polybenzoxazole monomers may be copolymerized with polyamide forming monomers. Thus, 3,3'-dihydroxybenzidine can be copolymerized with such diamines as tetramethylene diamine or hexamethylene diamine if equivalent quantities of dicarboxylic acids are present.

The properties of the polybenzoxazoles make these novel linear condensation polymers valuable plastics. The polybenzoxazoles have outstanding toughness and stiffness at room temperatures. Because of their high crystallinity, the properties of the polybenzoxazoles can be significantly improved through orientation by cold drawing. The polybenzoxazoles have in general high softening temperatures (300° C. or above) and can be applied over a wide range of temperatures. In comparison to many polyamides, the polybenzoxazoles possess outstanding resistance to moisture and weather exposure. The novel combination of properties of the polybenzoxazoles of the present invention makes them useful in the preparation of molded objects which are useful over a wide range of temperatures. The additional factors of high toughness and stiffness, particularly at high humidities, permits these polybenzoxazoles to be used in bristle applications and coatings of metal or other surfaces. The polybenzoxazoles of the present invention are also useful in electrical applications where rigidity at elevated temperatures and high softening temperatures are required. The polybenzoxazoles have increased stability to adverse effects of heat and light. The are also useful in the preparation of fibers.

As many widely different embodiments of this invention may be made without departing from the spirit and scope thereof, it is to be understood that this invention is not limited to the specific embodiments thereof except as defined in the appended claims.

We claim:

1. A normally solid polybenzoxazole comprising recurring structural units of the class consisting of

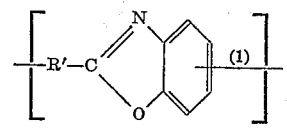

and

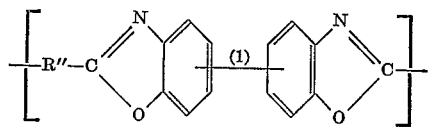

wherein R' is a divalent hydrocarbon radical having a carbon chain of at least one and not more than six carbon atoms and R" is a divalent hydrocarbon radical having from 4 to 8 methylene radicals, and wherein the carbon-to-carbon bond (1) is para to the polybenzoxazole forming ring substitutents on the phenyl ring, said polybenzoxazole having an inherent viscosity as measured in 0.5% solution in m-cresol of 0.4 to 1.5.

2. A normally solid polybenzoxazole comprising recurring structural units of the formula

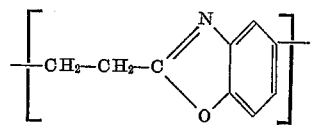

said polybenzoxazole having an inherent viscosity as measured in a 0.5% solution in m-cresol of 0.4 to 1.5.

3. A normally solid polybenzoxazole comprising recurring structural units of the formula

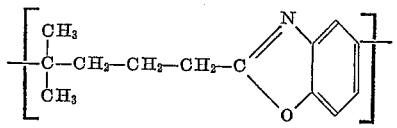

said polybenzoxazole having an inherent viscosity as measured in a 0.5% solution in m-cresol of 0.4 to 1.5.

4. A normally solid polybenzoxazole comprising recurring structural units of the formula

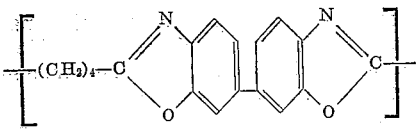

said polybenzoxazole having an inherent viscosity as measured in a 0.5% solution in m-cresol of 0.4 to 1.5.

5. A normally solid polybenzoxazole comprising recurring structural units of the formula

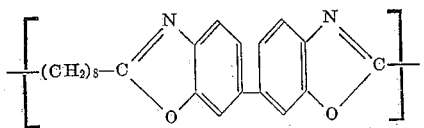

said polybenzoxazole having an inherent viscosity as measured in a 0.5% solution in m-cresol of 0.4 to 1.5.

6. The process of preparing polybenzoxazoles which consists of heating in the absence of oxygen, at a temperature of 100° C. to 350° C., benzoxazole forming compounds selected from the class consisting of 1,2-hydroxy-aminoalkanoic acids having the general formula

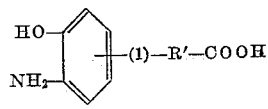

and mixtures of substantially equimolar quantities of bis-1,2-hydroxyaminophenyl compounds having the general formula

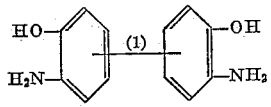

and dicarboxylic acids having the general formula HOOC—R″—COOH wherein R′ is a divalent hydrocarbon radical having a carbon chain of 1 to 6 carbon atoms and R″ is a divalent hydrocarbon radical having from 4 to 8 methylene radicals and wherein the carbon bond (1) is attached to a carbon atom having a position para to the benzoxazole forming ring substituents.

7. The process as set forth in claim 6 wherein the benzoxazole forming compound is 3-amino-4-hydroxyhydrocinnamic acid.

8. The process as set forth in claim 6 wherein the benzoxazole forming compound is 3-(3-amino-4-hydroxyphenyl)-3-methylbutyric acid.

9. The process as set forth in claim 6 wherein the benzoxazole forming compound is 5-(3-amino-4-hydroxyphenyl)-5-methylhexanoic acid.

10. The process as set forth in claim 6 wherein the benzoxazole forming compounds are 3,3′-dihydroxybenzidine and a dicarboxylic acid.

11. The process as set forth in claim 10 wherein the dicarboxylic acid is sebacic acid.

12. The process as set forth in claim 10 wherein the dicarboxylic acid is adipic acid.

References Cited in the file of this patent

UNITED STATES PATENTS

| | | |
|---|---|---|
| 2,279,745 | Stevenson | Apr. 14, 1942 |
| 2,463,838 | Wilson | Mar. 8, 1949 |
| 2,512,060 | Bolton et al. | June 27, 1950 |

OTHER REFERENCES

Bywater et al: J. Am. Chem. Soc., vol. 57, pp. 905–907, June 1945. (Copy in Scientific Library.)